United States Patent [19]

Westerhoff

[11] 4,207,920
[45] Jun. 17, 1980

[54] SWIVEL ASSEMBLY FOR INTERCONNECTING TWO RELATIVELY MOVABLE CONDUITS

[76] Inventor: Heinz Westerhoff, Jakobstr. 36, Mühlheim an der Ruhr, Fed. Rep. of Germany, 4330

[21] Appl. No.: 878,435

[22] Filed: Feb. 16, 1978

[51] Int. Cl.² .............................. F16L 3/12; F16L 3/00
[52] U.S. Cl. .................................. 137/615; 138/103; 138/107; 285/168
[58] Field of Search ...................... 285/61, 62, 63, 114, 285/168; 248/284; 138/103, 106, 107; 137/615; 403/26

[56] References Cited

U.S. PATENT DOCUMENTS

| | | | |
|---|---|---|---|
| 1,130,965 | 3/1915 | Doron | 285/168 |
| 1,853,207 | 4/1932 | Gold et al. | 138/103 |
| 2,739,778 | 3/1956 | Krone | 137/615 |
| 3,021,867 | 2/1962 | Gallagher | 137/615 |
| 3,965,938 | 6/1976 | Bauerle | 138/107 |

Primary Examiner—Martin P. Schwadron
Assistant Examiner—A. Michael Chambers
Attorney, Agent, or Firm—Karl F. Ross

[57] ABSTRACT

A swivel assembly for interconnecting a pair of relatively displaceable conduits comprises a pair of outer swivel fittings each connected via a respective outer pipe to a respective one of the conduits, and a pair of inner pipes each connected between the other side of each of the outer swivels and a respective side of a single inner swivel. The outer side of each of the outer swivels is clamped fixedly on the respective conduit so that there is no strain in the outer pipe between each of the outer swivels and the respective conduit. To this end each such outer pipe may include a U-shaped section lying in a plane including the swivel axis of the respective swivel fitting and perpendicular to the axis of the respective conduit.

10 Claims, 4 Drawing Figures

SWIVEL ASSEMBLY FOR INTERCONNECTING TWO RELATIVELY MOVABLE CONDUITS

FIELD OF THE INVENTION

The present invention relates to an assembly for interconnecting a pair of relatively movable conduits.

BACKGROUND OF THE INVENTION

It is frequently necessary to interconnect a pair of conduits or manifolds which are at least limitedly relatively displaceable. Such interconnection is frequently necessary in steam-heat systems where considerable thermal expansion and contraction frequently causes a significant shifting of conduits relative to each other. It is known to interconnect such conduits by means of an assembly formed of an inner and two outer swivel fittings in combination with two inner and two outer pipes. Each outer pipe is connected between one side of each of the outer swivel fittings and the respective conduit, and each inner pipe connects the other side of each of the outer swivel fittings to a respective side of the inner swivel fitting. The two conduits being interconnected are normally connected at locations where they run parallel to each other and wherein all of their relative motion is in the plane they define. The swivels are effective about swivel axes substantially perpendicular to this plane, with the inner pipes inclined to the plane and the outer pipes perpendicular thereto. Such an arrangement allows considerable shifting of the pipes relative to each other, both toward and away from each other and longitudinally relative to each other.

Each such fitting, although it allows swivelling of its sides relative to each other, nonetheless transmits at least a limited amount of torsion between its sides. Thus any relative shifting of the two conduits being interconnected will be transmitted at least in part as a strain to the joints at each end of each of the outer pipes. This strain is particularly harmful at the joint where each of the outer pipes connects to the respective conduit. Such a joint is typically welded, and is usually the failure point of such a connecting system.

Normally each of the outer pipes is provided with a cut off valve. Failure at the joints between each of the outer pipes and the respective conduit has the enormous disadvantage that it is necessary to shut down the entire system for repair. Any failure between the cut-off valves in the outer pipes, that is in the inner ends of the outer pipes, in the swivel fittings, or in the inner pipes, can normally be taken care of without shutting down the whole system merely by cutting off this part of the flow path with the two cut off valves.

OBJECTS OF THE INVENTION

It is therefore an object of the present invention to provide an improved assembly for interconnecting a pair of relatively displaceable conduits or manifolds.

Another object is the provision of such a system which will have a substantially longer service life than the above-described known system.

Yet another object is to provide such a system which, if it does fail, will not fail at the critical joints between each of the outer pipes and the respective conduit.

SUMMARY OF THE INVENTION

These objects are attained according to the present invention by securing the outer side of each of the outer swivels fixedly to the respective conduit. Thus no strain will be placed on any of the outer pipes, as the inner and outer ends of each of these outer pipes will be subjected to absolutely no torsion.

According to further features of this invention each of the outer pipes is formed at least in part of a U-shaped section having one end connected to the respective conduit and another end connected to the respective outer side of the respective swivel. The clamp is constituted as a U-bolt and base plate or shackle clamped over the respective outer swivel and clamping the respective outer side of this swivel via a positioning block on the respective conduit.

In a normal system wherein cut-off valves are provided in each of the outer pipes this arrangement has the considerable advantage that should failure occur in the interconnecting assembly it will invariably occur between the two cut-off valves. This makes it possible in a relatively easy manner to isolate the damaged section and repair it without having to shut down the entire system.

SPECIFIC DESCRIPTION

Figure 1:
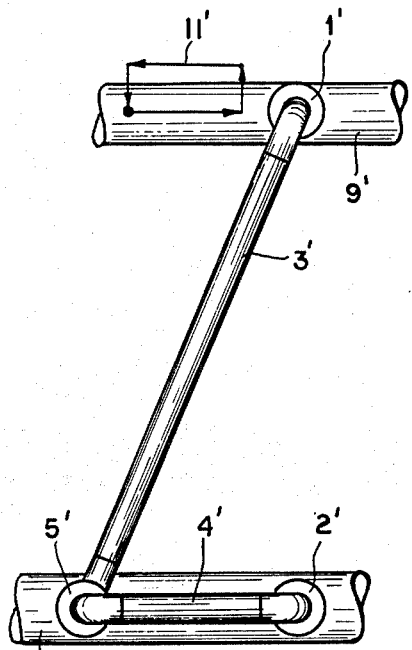
FIGS. 1 and 2 are side and end views of a prior-art system.
Figure 2:
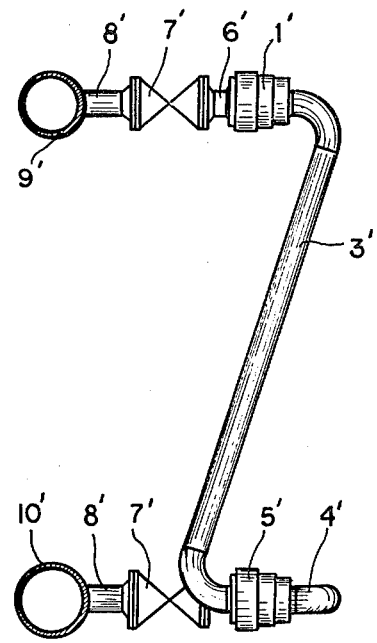

As shown in FIGS. 1 and 2 a prior-art system basically comprises a pair of outer swivels 1' and 2' connected together via a pair of inner pipes 3' and 4' in turn interconnected by means of another swivel 5'. Each of the outer swivels 1' and 2' is connected to a respective conduit 9' or 10' by means of a respective outer pipe formed by a pair of pipe sections 6' and 8' between which is provided a cut-off valve 7'. In this arrangement the upper conduit 9' can move relative to the lower conduit 10' as shown by the arrows 11'. Thus it should be clear that no matter what a strain will be created at each of the joints at each end of each of the outer pipes 6' and 8'.

According to the instant invention a lower conduit 10 extends parallel to an upper conduit 9 which can move relative to this lower conduit 10 as shown by arrows 11, that is in a plane P defined by the axes of these two conduits 9 and 10.

Welded to each of the conduits 9 and 10 is a short straight pipe section 8 extending perpendicular to the plane P. Connected to the inner end of each of these straight sections 8 is a U-shaped piece of pipe 14 lying in a plane perpendicular to the plane P and including the axis of the pipe section 8. Connected in turn to the inner end of each of these U's 14 is the outside end of a cut-off valve 7 whose inside end in turn is connected to a respective pipe section 6 centered on an axis perpendicular to the plane P and parallel to the axis of the section 8.

The section 6 of the upper pipe 9 is connected to the outside 1a of a swivel 1 having another side 1b swivelable relative to the side 1a about an upper axis A perpendicular to the plane P.

A pair of U-bolts 13 flanking the pipe sections 6 and 7 and the swivel 1 clamp this swivel 1 by means of a shackle 12 and an interposed positioning block 15 to the respective upper conduit 9.

The inner side 1b of the swivel 1 is connected via a conduit 3 to one side of an inner swivel 5 identical to the swivel 5' and in turn connected via another inner pipe 4 to another swivel 2. Yet another clamp formed of a shackle 12, U-bolt 13, and the positioning block 15 secure the outer side of this swivel 2 to the lower conduit 10 in the same manner as the upper swivel 1.

Figure 3:
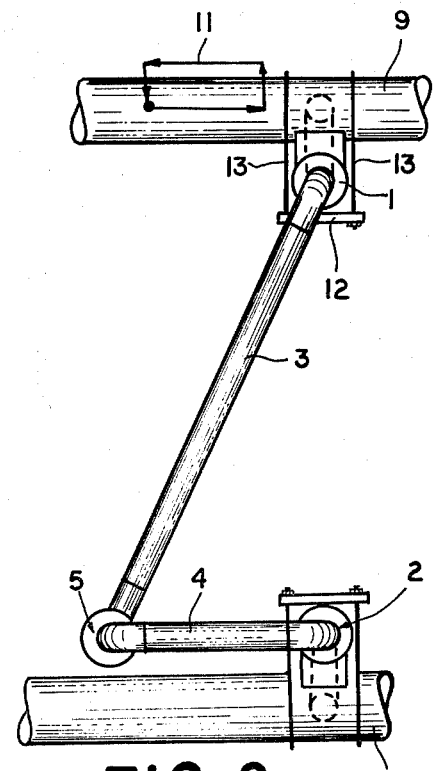
FIGS. 3 and 4 are side and end views of the system according to the instant invention.
Figure 4:
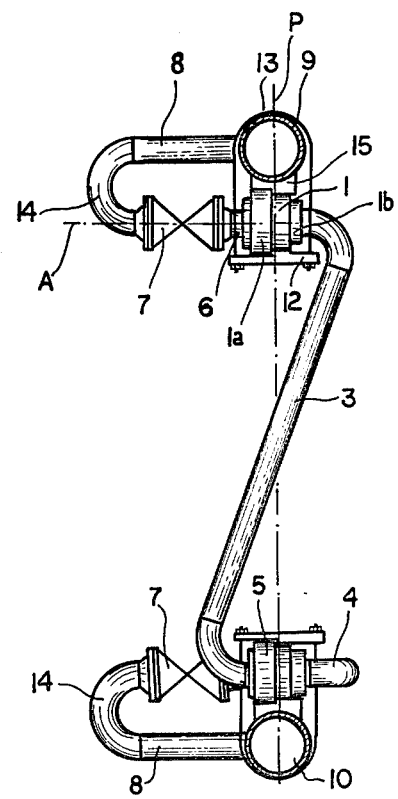

With the system described above with reference to FIGS. 3 and 4 it is therefore apparent that there will be no strain in the various fittings between the outside of each of the outer swivels 1 and 2 and the respective conduits 9 and 10. All of the strain will on the contrary be between these two swivels 1 and 2 and, therefore, between the two cut-off valves 7. Strain in this part of the system could not be avoided under any circumstances, but according to the invention is at least segregated to the region between the cut-off valve so that repair can be a relatively simple task.

I claim:

1. An assembly for interconnecting two relatively longitudinally movable conduits, said assembly comprising:
   - at least two swivel fittings each having a pair of relatively swivelable sides;
   - two respective inner pipes each having one end rigidly connected to one side of the respective fitting, said inner pipes having means swivelably interconnecting other ends of said inner pipes to each other;
   - respective outer pipes rigidly connected between said conduits and further connected to said other sides of said fittings; and
   - means fixing said other sides immovably on the respective conduits for eliminating torsional strain in the respective outer pipes.

2. The assembly defined in claim 1 wherein said means is a clamp on each of said conduits engaging said other side of the respective swivel fitting.

3. The assembly defined in claim 2 wherein said clamps each comprise at least one U-bolt and a base plate.

4. The assembly defined in claim 3 wherein each of said clamps comprises two such U-bolts engaging the respective conduit, said base plate engaging the respective other side.

5. The assembly defined in claim 1 wherein said outer pipes each include a U-shaped section each having one end fixed to the respective conduit and another end connected to the respective other side.

6. The assembly defined in claim 5 wherein said outer pipes are each provided with a cut-off valve.

7. The assembly defined in claim 1 wherein said conduits are substantially parallel, said fittings being swivelable about respective axes all substantially perpendicular to the plane of said conduits.

8. The assembly defined in claim 1, wherein said interconnecting means further comprises an additional swivel fitting swivelably interconnecting said other ends of said inner pipes.

9. An assembly for interconnecting two relatively longitudinally movable and generally parallel conduits, said assembly comprising
   - two respective swivel fittings each having a pair of sides and each defining a respective swivel axis generally perpendicular to the respective conduit;
   - two respective outer pipes each having one end connected to and opening into the respective conduit and another end connected to one side of the respective swivel fitting;
   - means including two respective holding blocks braced between the respective one sides of said fittings and the respective conduits and two respective U-bolts clamping said one sides of said fittings via the respective blocks against the respective conduits for securing said one sides of said respective swivel fittings nondisplaceably on the respective conduits for relieving torsional strain in the respective outer pipes; and
   - two respective inner pipes each having one end rigidly connected to the other side of the respective fittings, said inner pipes having means swivelably interconnecting other ends of said inner pipes to each other.

10. The assembly defined in claim 9, wherein said interconnecting means further comprises an additional swivel fitting swivelably interconnecting said other ends of said inner pipes.